United States Patent Office 2,817,204
Patented Dec. 24, 1957

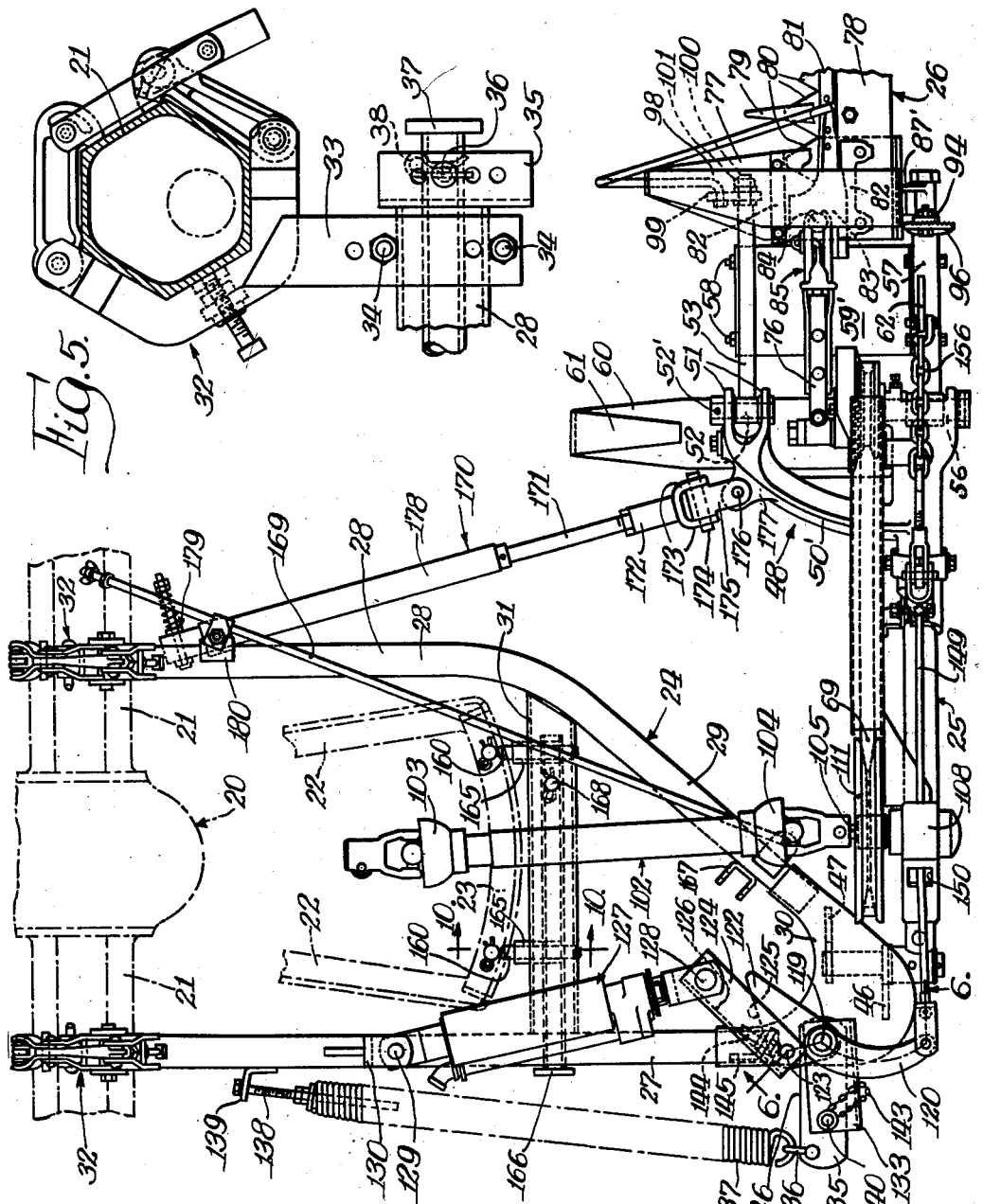

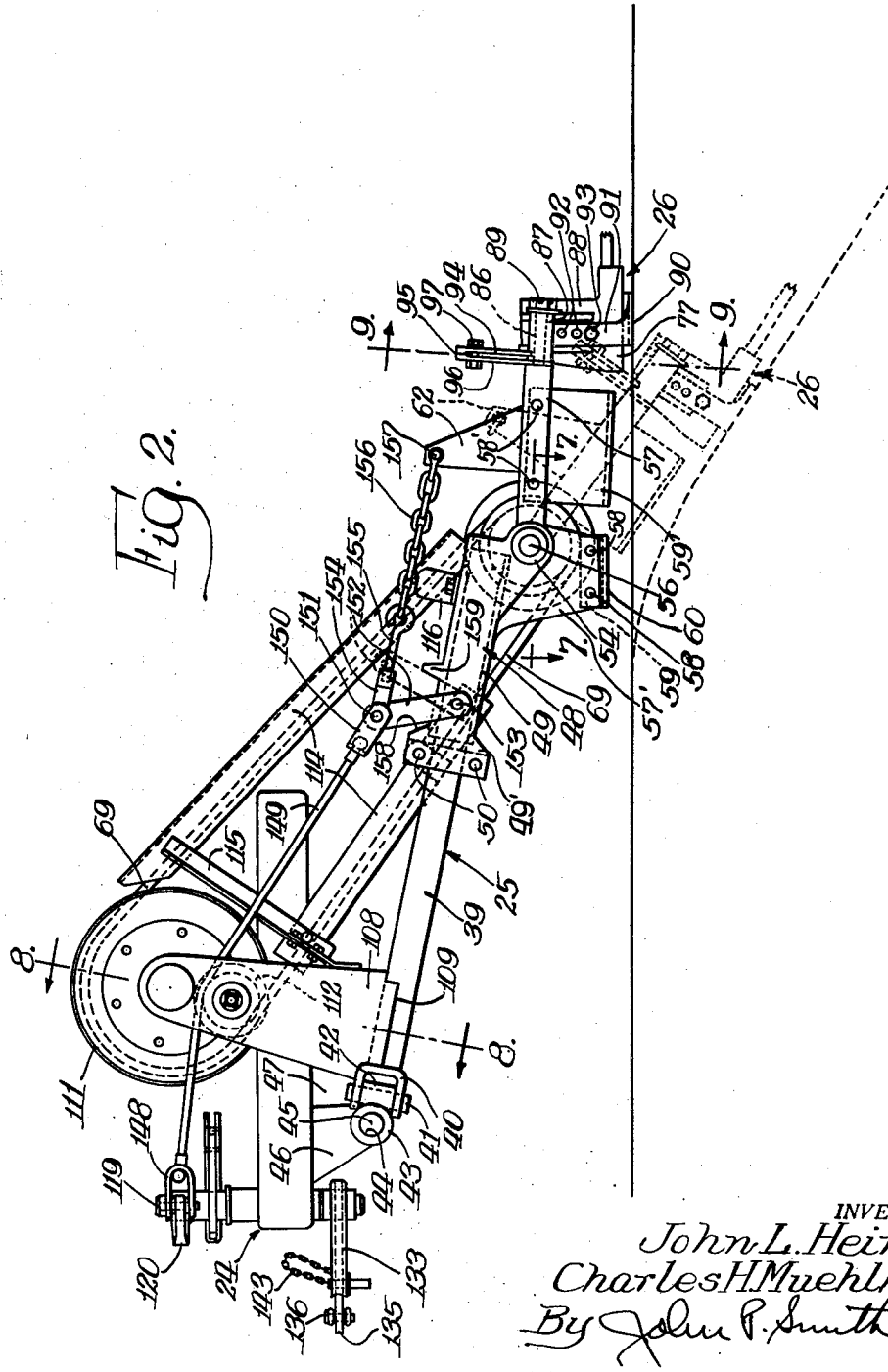

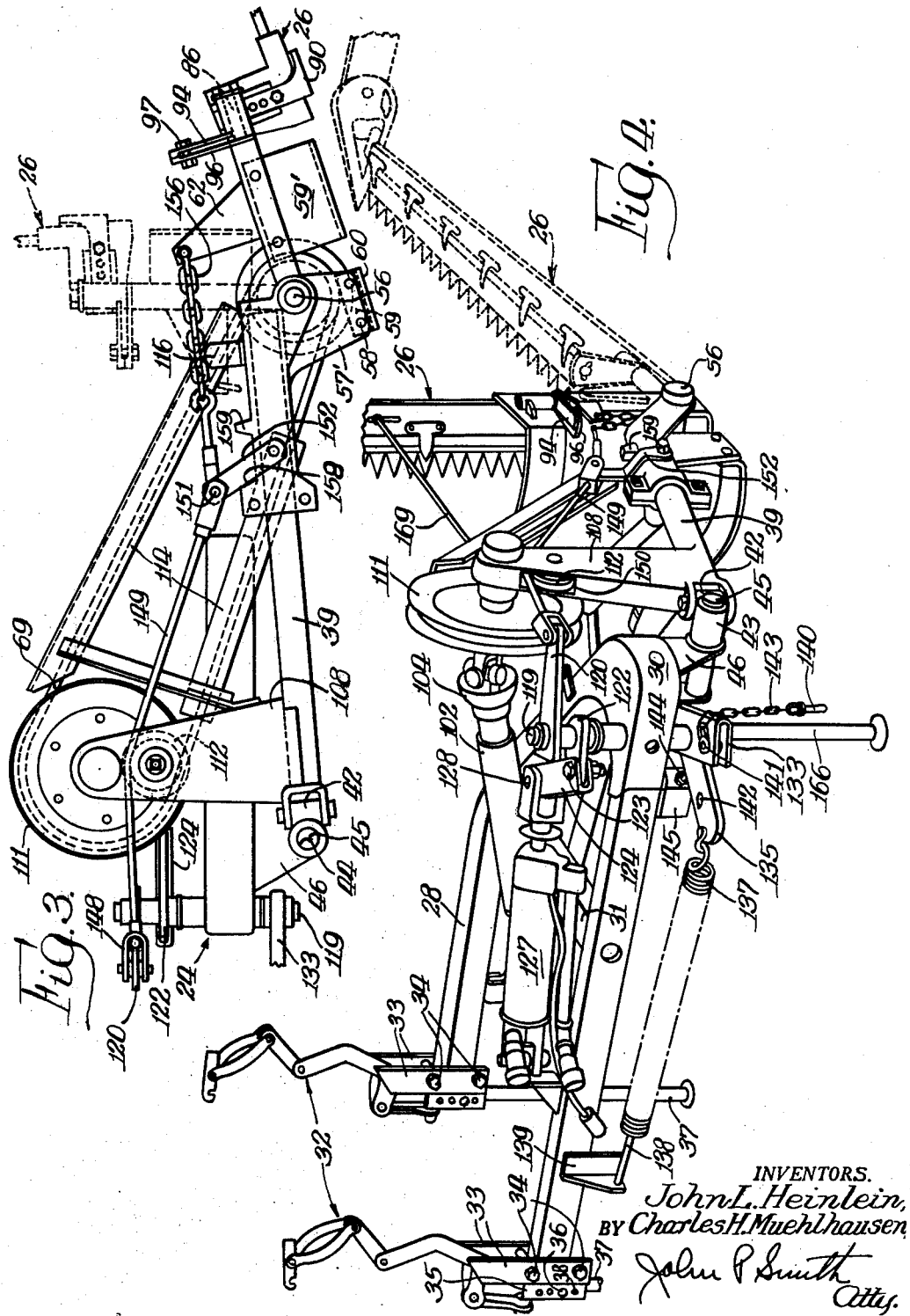

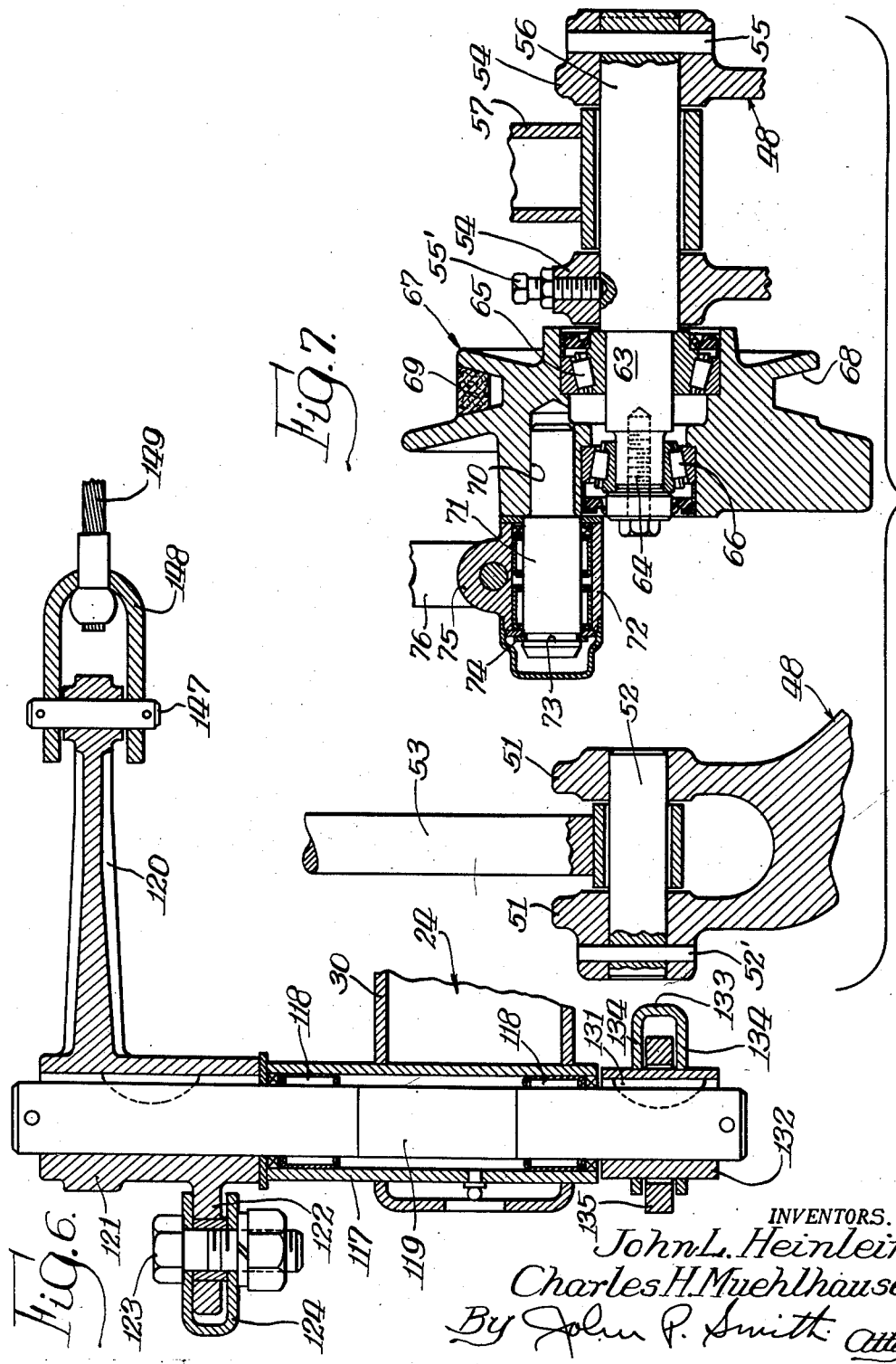

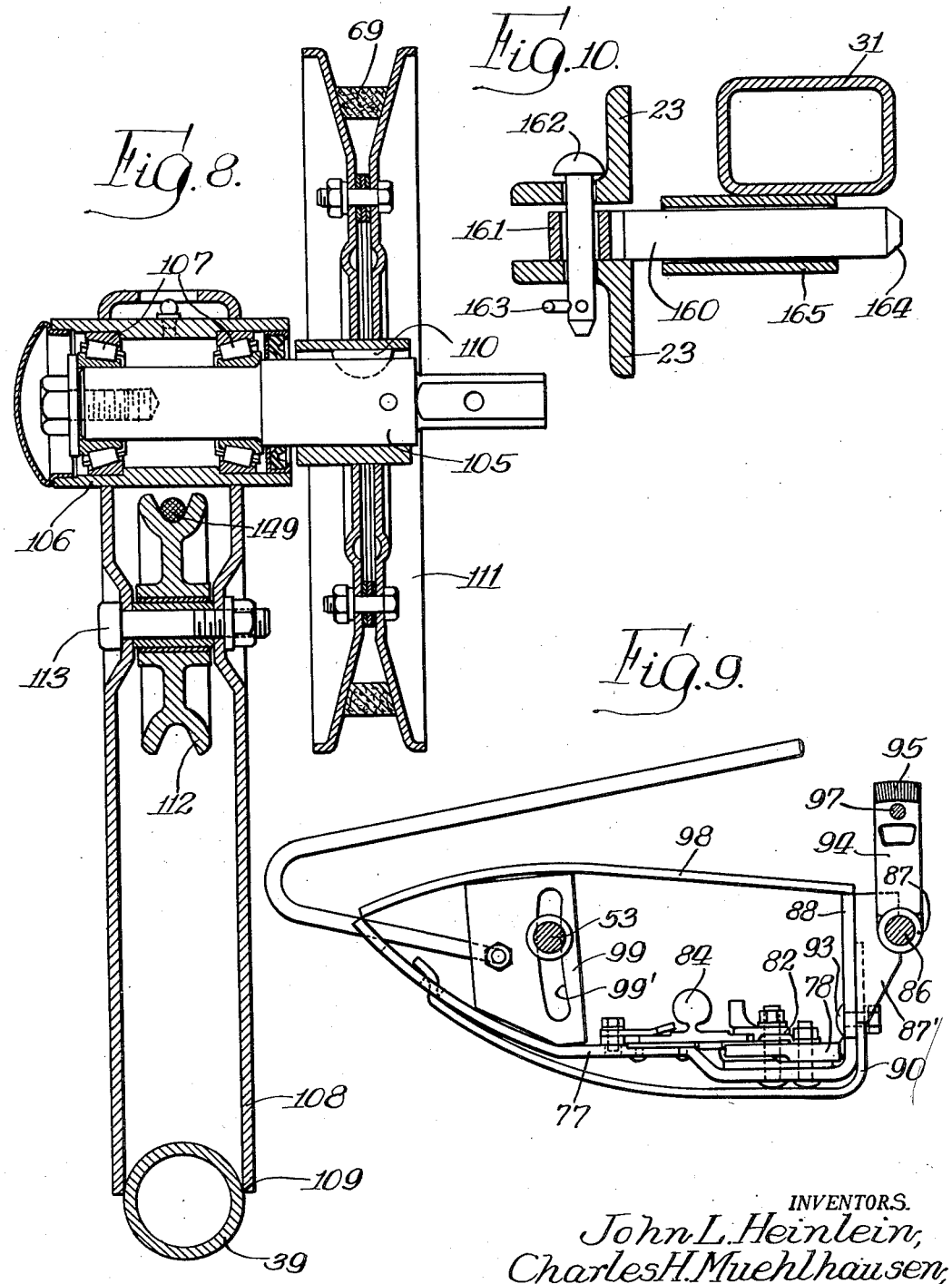

2,817,204

MOUNTING AND CONTROL MEANS FOR A TRACTOR MOUNTED MOWER

John L. Heinlein and Charles H. Muehlhausen, Shelbyville, Ill., assignors to The Oliver Corporation, a corporation of Delaware Application October 7, 1953, Serial No. 384,738

8 Claims. (Cl. 56—25)

The present invention relates generally to a rear mounted tractor mower, but more particularly to a novel and improved construction of a tractor mounted mower which will facilitate a quick and easy removal of the mower from the tractor or attachment thereto with a minimum of time and effort.

A further object of the invention is to provide a novel and improved construction of rear mounted tractor mower wholly supported by the tractor and in which a hydraulic cylinder unit mounted on the mower frame is adapted to actuate the cutter bar assembly to various positions of adjustment.

A further object of the invention is to provide a novel and improved tractor mounted mower in which the power takeoff of the tractor is operatively connected to a belt pulley drive which in turn, is operatively connected to the cutting mechanism so as to render the knife operable in all positions of adjustment of the cutter bar.

A still further object of the invention is to provide a novel and improved rear mounted tractor mower in which a balancing spring is operatively connected with the cutter bar mechanism for floatingly supporting it in operative position and having means associated therewith for disconnecting the tension of the spring from the cutter bar connections when the mower is disconnected from the tractor and supported on jack legs.

A still further object of the invention is to provide a novel and improved rear mounted tractor mower in which the frame thereof is preferably made of tubular members for supporting therein the jack legs when the same are not in use.

Another object of the invention is to provide a novel and improved rear mounted tractor mower having quick detachable clamping means associated therewith for quick and easy attachment to or removal from the axle housing of the tractor.

These and other objects are accomplished by providing a construction and an arrangement of the various parts in the manner hereinafter described and particularly pointed out in the appended claims.

Referring to the drawings:

Fig. 1 is a fragmentary top plan view of our improved rear mounted mower;

Fig. 2 is a rear elevational view of the mower illustrated in Fig. 1 showing the bar in operative or cutting horizontal position and in broken lines shown in an angular position below the horizontal;

Fig. 3 is a similar rear elevational view showing the stop limiting the adjustment of the outer shoe with respect to the inner shoe; the broken line position shows the cutter bar raised to its vertical position for transporting;

Fig. 4 is a fragmentary perspective view showing the mower dismounted from the tractor and supported on its three jack legs and showing the balancing spring disconnected from the lifting crank and cable connections to the cutter bar and the broken lines show the cutter bar in horizontal position;

Fig. 5 is an enlarged fragmentary elevational view with parts broken away and shown in section showing the manner in which the mower frame is attached to the axle housing of the tractor;

Fig. 6 is an enlarged cross-sectional view taken on the line 6—6 in Fig. 1;

Fig. 7 is an enlarged cross-sectional view taken on the line 7—7 in Fig. 2;

Fig. 8 is an enlarged cross-sectional view taken on the line 8—8 in Fig. 2;

Fig. 9 is an enlarged fragmentary cross-sectional view taken on the line 9—9 in Fig. 2; and Fig. 10 is an enlarged detailed cross-sectional view taken on the line 10—10 in Fig. 1.

In illustrating one form our invention may assume in practice, we have shown the same in connection with a tractor, only a fragmentary portion of which is shown in Fig. 1 of the drawings, and generally indicated by the reference character 20. The tractor in this instance is provided with oppositely disposed hexagonal axle housings 21. The tractor is also provided with the usual longitudinally extending slightly diverging draft bar members 22 which have their forward ends pivotally secured to the lower portion of the axle housing in the manner well understood in the art. Secured to the rear ends of the members 22 are two vertically spaced apart arcuate transverse draw bars 23. (See Figs. 1 and 10 of the drawings.) The draft bar members 22 are provided with two upwardly extending adjustable supporting braces (not shown) which have their upper ends connected to the tractor frame and their lower ends adjustably connected with the draft bars 22.

Our improved tractor mower comprises a rigid main frame, generally indicated by the reference character 24, an intermediate or coupling bar frame, generally indicated by the reference character 25, and pivoted to the main frame 24, and a cutter frame or bar assembly, generally indicated by the reference character 26 and pivoted to the intermediate or coupling bar frame 25. The main frame 24 of the mower comprises a substantially longitudinally extending tubular frame member 27 on one side thereof and a second longitudinally extending tubular frame member 28 on the other side, which has its rear portion bent inwardly and converging toward the frame member 27. The rear ends of these two frame members 27 and 28 are connected or welded to a hollow U-shaped bracket 30 so as to form a rigid main frame. Extending between the members 27 and 28 at points intermediate their ends is a tubular transverse brace member 31. Secured to the forward end of each of the main frame members 27 and 28 are conventional quick detachable clamping members, generally indicated by the reference character 32. These clamping members are of a construction similar to that disclosed in the H. E. Altgelt Patent No. 2,361,362, October 31, 1944, and comprise a plurality of pivoted links and include a toggle locking mechanism so as to engage and clamp rigidly to the hexagonal axle housing 21 of the tractor 20 as clearly shown in Figs. 1, 4 and 5 of the drawings. These clamping members 32 are secured to the main frame members 27 and 28 by depending spaced apart plates 33 which have their upper ends welded to one of the links of each of the clamping members 32 and their lower ends adjustably secured by means of bolts 34 to each of the members 27 and 28. Vertically secured to the forward ends of the frame members 27 and 28 are channel members 35. These channel members have a plurality of vertically spaced apart apertures for the reception of a pin 36 so that the jack legs 37 may support the forward end of the mower frame 24 when the mower is detached from the tractor, as shown in Fig. 4 of the drawings. These jack legs 37, when not in use, may be inserted in the tubular frame members 27 and 28 as shown in Fig. 5 of the drawings. The jack legs are secured in position, as shown in Fig. 5 by the same pin 36 and spring clip 38.

The intermediate or coupling frame 25 comprises a laterally extending tubular member 39 and has its stubbleward end pivoted on a horizontal and vertical pivot for universal movement on the main frame 24. This means includes a spaced apart apertured eared bracket 40 secured to the stubbleward end of a coupling bar 39. The bracket 40 is pivoted on a vertically disposed pin 41 which, in turn, is secured to a vertical barrel 42 of a bearing bracket 43. The bearing bracket 43 has a horizontal bore 44 and is mounted on a shaft 45 which, in turn, has its intermediate and forward ends secured to and supported in depending plates 46 and 47 which are welded to the lower side of the U-shaped bracket 30. Secured to the outer end of the coupling frame member 39 is a yoke member, generally indicated by the reference character 48. This yoke member comprises a transversely extending sleeve 49 which embraces the outer end of the coupling bar 39 and is secured thereto by means of an arcuate collar 49' and bolts 50. The yoke member 48 has a forwardly curved arm 50' which terminates in laterally projecting spaced apart apertured ears 51. Extending through these apertured ears 51 is a pin 52. Journaled on the pin 52 between the ears 51 is a tension bar 53. Formed integrally the forwardly curved arm 50' of the yoke member 48 adjacent the outer end of the sleeve 49 are a second pair of spaced apart apertured ears 54 in which is secured a longitudinally extending fly wheel shaft 56. The shaft 56 is retained in position by a transverse pin 55 extending through one of the ears 54 and the shaft 56, and by a set screw 55' extending through the other ear 54 and engaging the shaft 56. (See Fig. 7 of the drawings.) The fly wheel shaft 56 and the pin 52 are in longitudinal alignment with one another and together form the horizontal pivot about which the cutter bar assembly 26 swings in its movement with respect to the intermediate or coupling bar assembly 25. Pivoted on the shaft 56 between the spaced apart ears 54 of the yoke 48 is a compression bar 57. Secured by means of bolts 58 to a vertical depending web 57' of the yoke 48 is a rearward vertical wall 59 of a longitudinally extending tapered inside shoe 60 which terminates in an upwardly curved and rearwardly extending tapered portion 61. (See Figs. 1 and 2 of the drawings.) Rigidly attached to the compression bar 57 is an upwardly extending arm 62 for the purpose hereinafter described. Secured to the tension bar 53 and the compression bar 57 by means of bolts 58' is a substantially U-shaped shield or guard 59'. Journaled on the reduced portions 63 and 64 of the shaft 56 by means of anti-friction bearings 65 and 66 is a combination fly wheel and belt pulley, generally indicated by the reference character 67. (See Fig. 7 of the drawings.) The fly wheel belt pulley 67 is provided with a shallow or flattened V-shaped annular groove 68 in which is trained a drive belt 69. Located eccentrically with respect to the shaft 56 and secured to the forward face of the fly wheel 67 in horizontal aperture 70 is a crank or pitman pin 71. Journaled on the crank pin 71 with suitable bearings and washers is a pitman sleeve 72. The forward end of the pin 71 is suitably grooved as shown at 73 for the reception of a snap ring 74 for retaining the pitman sleeve 72 on the pitman or crank pin 71. The sleeve 72 is provided with the usual apertured ear 75 to which the pitman 76 is pivotally connected.

The cutter bar assembly 26 includes a shoe 77. Secured to the shoe 77 is a laterally projecting tapered mower bar 78. The mower bar is provided with the conventional uniformly spaced apart guards 79. Reciprocally mounted adjacent the forward side of the bar 78 and in cooperation with the guard 79 are the conventional cutter bar sections 80 which, in turn, are secured together by a section bar 81. Adapted to reciprocate in the shoe 77 between the usual spaced apart guides 82 is a reciprocating plate 83 which is provided with the usual bearing ball 84. The pitman 76 is provided with the conventional detachable bearing ball sockets, generally indicated by the reference character 85, for engaging the bearing ball 84 for driving the cutter knife 80.

The cutter bar assembly 26 can be tilted with respect to the inner shoe 60 or the lead of the cutter bar assembly can be adjusted if so required. Secured in a tubular compression bar 57 is a laterally extending shaft 86 on which is journaled bearing barrel 87 which, in turn, is secured to horizontally spaced vertical flanges 87' of the rear wall 88 of the shoe 77. (See Figs. 1 and 9 of the drawings.) The barrel 87 is retained on the shaft 86 by a horned nut 89 mounted in threaded engagement with the end of the shaft 86. A conventional wearing plate 90 extending longitudinally of the bottom of the shoe 77 has its forward end pivoted to the bottom of the shoe and its rear end turned at right angles, as shown at 91. This wearing plate 90 can be vertically adjusted with respect to the shoe 77 by inserting a bolt 93 in various spaced apart apertures 92 therein.

Secured to the inner end of the sleeve 87 is an upwardly extending arm 94 which is provided with serrations on its face, as shown at 95. Secured to the outer end of the compression bar 57 and located adjacent the arm 94 is an upwardly extending arm 96 having an arcuate serration in the outer face thereof for engaging the serrations 95 of the arm 94. Transverse locking bolt 97 extends through an arcuate slot in the arm 96 and the perforation in the arm 94 for securely locking the cutter bar assembly 26 in the proper tilted position. (See Figs. 1, 2 and 9 of the drawings.) Mounted above the shoe 77 and secured thereto at the forward and rearward ends is a longitudinally extending flat shield plate 98. Mounted between the shoe 77 and the shield 98 is a vertical plate 99 which is provided with an arcuate slot 99'. The slot 99' is located concentric with respect to the axis of the shaft 86. Extending through the slot is a reduced end of the tension rod 53 as shown at 100 and has mounted thereon in threaded engagement therewith a nut 101. Obviously, washers on either side of the plate 99 can adjust the lead of the cutter bar assembly 26 with respect to the coupling bar assembly 25. At the same time it will be noted that when adjustment for regulating the tilt of the bar is required, the tension bar is also adjusted in the arcuate slot in the plate 99.

The mower in this instance is driven from the power takeoff shaft (not shown) of the tractor 20 and is connected in the usual manner with a telescoping connection, generally indicated by the reference character 102. This telescoping connection is connected to the usual two spaced apart universal joints 103 and 104. The universal 104 is connected to a supplemental drive shaft 105. The shaft 105 is journaled to a sleeve or bearing 106 through the medium of anti-friction bearings 107. The bearing or sleeve 106 is secured to the upper end of a vertically disposed hollow standard 108. The lower end of this standard 108 is welded, as shown at 109, to the coupling bar 39. (See Figs. 2 and 8 of the drawings.) Secured to an intermediate portion of the shaft 105 adjacent the bearing 106 by means of a key 110 is an adjustable drive pulley 111 about which the drive V-shaped belt 69 is trained for driving the cutting mechanism. Mounted within the hollow standard 108 at a point slightly below the bearing 106 is a V-shaped pulley 112 journaled on a transverse pin or bolt 113, supported in aligned apertures in the opposite sides of the standard 108. Suitable spaced apart guard rails 114 extend parallel to the upper and lower laps of the belt 69 for shielding the same. These guard rails are supported in position by angularly disposed braces and brackets 115 and 116 respectively, which are secured to the adjacent frame parts of the coupling bar assembly 25.

The balancing spring which floatingly supports the cutter bar assembly 26 in contact with the ground and the hydraulic unit which lifts the cutter bar assembly 26 and the coupling bar assembly 25 in various positions of adjustment will next be described. Rigidly mounted in suitable apertures in the V-shaped portion 30 of the main frame 24 is a vertical bearing barrel or sleeve 117. (See Figs. 1, 4 and 6 of the drawings.) Oscillatably mounted on suitable vertically spaced apart anti-friction bearings 118 in the sleeve 117 is a vertical shaft 119. Keyed to the upper end of the shaft 119 is a rearwardly curved crank arm or lever 120. Formed integrally with a hub portion 121 of the lever 120 is a forwardly projecting triangularly shaped arm 122. Pivoted on a bolt 123 adjacent one corner of the triangularly shaped arm 122 is a channel shaped lever 124. In certain operational movements in lifting the cutter bar by the hydraulic unit, the angularly disposed rear edge 125 of the arm 122 is adapted to be engaged by the channel bottom 126 of the lever 124 when the hydraulic unit is energized to lift the cutter bar mechanism or, under certain other operational conditions, the triangularly shaped arm 122 may move rearwardly away from the lever 124 by the weight of the cutter bar assembly so that the cutter bar may floatingly engage the ground under all terrain conditions. The details of the operation of this assembly will hereinafter be more fully described. The piston rod end of the hydraulic cylinder unit, generally indicated at 127 is pivotally connected as shown at 128 to the lever arm 124. The hydraulic unit in this instance, of course, is connected by suitable conduits to the source of fluid pressure driven by the tractor in the manner well understood in the art. The forward end of the hydraulic cylinder unit is pivotally connected as shown at 129 to a bracket 130 adjustably secured to the top side of the frame member 27. Rigidly secured to the lower end of the shaft 119 by means of a key 131 is a sleeve or hub 132. Rigidly secured to the hub 132 is a channel-shaped lever 133. Journaled on the hub 132 between the spaced apart flat upper and lower sides 134 of the channel lever 133 is a balancing spring lever 135. The free end of the lever 135 is connected by means of a bracket 136 to the rear end of a balancing spring 137. The forward end of the balancing spring is adjustably connected to an adjusting bolt 138 which extends through an aperture bracket 139 secured to the side of the frame member 27. Obviously the tension of the balancing spring 137 may be regulated by adjusting the bolt 138 in a manner well understood in the art. In order to lock the spring balancing lever 135 to the lever 133 a removable pin 140 may be inserted in registering apertures 141 of the lever 133 with the registered slot 142 of the lever 135. (See Fig. 4 of the drawings.) The pin 140 is anchored to the lever 133 by a chain 143 in order to prevent the same from becoming lost. In order to facilitate the insertion or removal of the pin 140 between these operating levers 133 and 135, the forward movement of the lever 135 is limited by an adjustable stop in the form of a bolt 144 which is mounted in a downwardly projecting bracket 145 secured to the bottom side of the V-shaped member 30 of the main frame 24.

In one of the operations of removing the mower assembly from the tractor, the pin 140 has to be removed. This is accomplished by energizing the hydraulic unit 127 and lifting the cutter bar to its elevated or vertical position until the forward edge 146 of the lever 135 strikes the stop or head of the bolt 144, in which case the pin 140 can be freely removed.

It is necessary to remove the tension of the balancing spring because this spring has sufficient force to cause the frame to twist over about the pivot point between the coupling bar and cutter bar assemblies, in which case it would be impossible to support the mower in "rest" position on its jack legs.

The free end of the lever arm 120 is pivotally connected by means of a pin 147 in the U-shaped coupling member 148 to a cable 149. The cable 149 extends through the opposite openings 150 in the hollow frame or standard 108 and is trained over the top of the pulley 112 within the housing 108. The outer end of the cable 149 is connected to a U-shaped coupling member 150 which, in turn, is pivotally connected, as shown at 151, to a lever 152. The lever 152 consists of two flat members with the lower portions offset or spaced outwardly to extend on each side of the barrel portion 49 and is pivoted thereto as shown at 153. Pivoted on the pivot pin 151 is an internally threaded link 154 in which is threadedly mounted an adjustable eye 155. The eye 155 is connected by a chain 156 to the upper end of the arm 62 as shown at 157. The sleeve 49 of the yoke member 48 is provided with an upwardly inclined stop 158 which is adapted to be engaged by the lever 152 in limiting the outer shoe 77 of the cutter bar assembly 26 in its movement upwardly with respect to the inner shoe 60. (See Figs. 1 and 2 of the drawings.) The sleeve 49 of the yoke 48 is provided with a second upwardly extending stop 159 which is adapted to be engaged by the lever 152 for limiting the downward movement of the cutter bar assembly 26 below the horizontal or to the position shown in broken lines in Fig. 2 of the drawings.

When the mower is supported on the jack legs in the position shown in Fig. 4 of the drawings, the tractor may be backed into the mower frame so that the hexagonal axle housings 21 are positioned against the opened clamps 32. At the same time the hitch pins 160 on the drawbar 23 of the tractor enter spaced apart tubes 165 on the cross frame 21 of the main frame 24 of the mower for the purpose of centering the mower on the tractor before the clamps 32 are secured to the axle housing. These hinge pins 160 are spaced equal distances laterally of the center of the drawbar 23 and are provided with apertured forward ends 161 for pivotally and detachably securing the same by vertically disposed pins 162 between the vertical spaced apart drawbars 23. (See Fig. 10 of the drawing.) The pins 162 are retained in position by the usual hair pins 163. The rearward ends of pins 160 are tapered, as shown at 164, so that the same are easily guided into guide tubes 165 which are welded to the underside of the brace member 31 of the mower frame 24.

As previously pointed out, the complete mower attachment is supported for storage or preparatory for attachment to the tractor on the two front jack legs 37, as shown in Fig. 4 of the drawings, and is supported at the rear end by a third jack leg 166. This jack leg 166 is supported in vertical position between an apertured eared bracket 167 by a pin which extends through an opening in the upper end of the jack leg 166 and through the apertured ears of the bracket 167. This bracket 167 is secured to the inside member 29 of the main frame member 24. (See Fig. 1 of the drawings.) In Fig. 1 of the drawings it will be noted that the pin 168 also performs the function of retaining the jack leg 166 in the tubular brace member 31 when the same is not in use. In other words, when these jack legs 37 and 166 are not in use, they are retained in the tubular frame members 27, 28 and 31 of the main frame 24 by the same means which retains them to support the mower in position for attachment or detachment from the tractor. The cutter bar assembly 26 may be swung up at right angles to the coupling bar assembly 25 or to the position shown in Fig. 4 of the drawings, and retained in that position by a brace rod 169 in the manner well understood in the art.

The mower attachment is provided with a break-away bar which permits the cutter bar assembly 26 and the coupling frame 25 to swing rearwardly about its vertical pivot 41 when an obstruction is encountered by the cutting mechanism so as to prevent damage to these operating parts. The angle of the swing back of these two assemblies must not exceed the permissible angle of the power take-off shaft knuckles. The break-away bar is also provided with a telescoping part which has a spring actuated lock at one end. This spring lock keeps the telescoping members together until a force is encountered with the cutter bar that is greater than the tension of the spring locks. To return the break-away bar to its normal position, the tractor is reversed and the bar will slide back together and latch. This mechanism includes a break-away bar, generally indicated by the reference character 170 which comprises a rod 171 having its rear end threaded and adjustably mounted in an internally threaded sleeve 172. The sleeve 172 has formed integrally therewith spaced apart apertured ears 173 which, in turn, is pivotally mounted by means of a pin 174 to a bracket 175. The bracket 175 is provided with spaced apertured ears through which a pin 176 projects for pivotally connecting the same to an apertured ear 177 formed integrally with the yoke 48. The rod 171 is telescopically mounted in the tubular member 178. The rod 171 extends substantially throughout the length of the tubular member 178 and is adapted to be engaged by a spring latch, generally indicated by the reference character 179. The forward end of the tubular member is pivotally attached to a depending bracket 180.

Summarizing the advantages and functions of operation of our improved tractor mower attachment, it will be observed that the pin 140 can be removed or inserted in the aligned apertures 141 and the slotted aperture 142 of the levers 134 and 135 respectively by raising the cutter bar assembly 26 to the vertical position shown in Fig. 4 of the drawings. In this position the lever 135 contacts the stop 144 and the tension of the balancing spring 137 is removed from the coupling frame 25 and the cutter bar assembly 26. When the operator desires to attach the mower to the tractor, the quick operating clamps 32 are attached to the axle housings in the manner previously described, after which the hydraulic unit 127 is energized to actuate the lever 124 and with it the lever 122. This, in turn, actuates the shaft 119 and with it the lever 133. The pin 140 may then be inserted in the aligned apertures in the manner previously described.

From the above specification it will be readily understood that we have not only provided a quickly attachable as well as simple and light weight mower attachment for a tractor, but also one which is capable of operating the cutting mechanism in all angular positions from the vertical position to an angular position below the horizontal.

While in the above specification we have described one embodiment which our invention may assume in practice, it will, of course, be understood that the same is capable of modifications and that such modifications may be made without departing from the spirit and scope of the invention as expressed in the appended claims.

What we claim as our invention and desire to secure by Letters Patent is:

1. A tractor mower comprising a main frame, an intermediate frame universally pivoted to said main frame, a cutter bar frame pivoted to said intermediate frame on a horizontal axis, a vertically disposed shaft journaled on said main frame and a balancing spring carried by said main frame and connected to said shaft for urging said shaft to rotate in one direction, and operative connections between said shaft and said intermediate and cutter bar frames for floatingly supporting said cutter bar frame in floating engagement with the ground.

2. A tractor mower comprising a main frame, an intermediate frame universally pivoted to said main frame, a cutter bar frame pivoted to said intermediate frame on an horizontal axis, a fluid motor carried by said main frame, a balancing spring carried by said main frame, and means including a vertically disposed shaft journaled on said main frame for operatively connecting said fluid motor and said spring with said intermediate and cutter bar frames.

3. A tractor mower comprising a main frame, an intermediate frame universally pivoted to said main frame, a cutter bar frame pivoted to said intermediate frame on an horizontal axis, a fluid motor carried by said main frame, a balancing spring carried by said main frame, a shaft journaled on said main frame and a plurality of levers carried by said shaft and connected to said fluid motor and spring for operatively connecting said motor and spring with said intermediate and cutter bar frames.

4. A tractor mower comprising a main frame, an intermediate frame universally pivoted to said main frame, a cutter bar frame pivoted to said intermediate frame on an horizontal axis, a fluid motor carried by said main frame, a balancing spring carried by said main frame, a shaft journaled on said main frame, a lever secured to said shaft and connected to said fluid motor, a second lever secured to said shaft and connected to said spring, and a third lever secured to said shaft and operatively connected to said intermediate and cutter bar frames.

5. A tractor mower comprising a main frame, an intermediate frame universally pivoted to said main frame, a cutter bar frame pivoted to said intermediate frame on an horizontal axis, a fluid motor carried by said main frame, a balancing spring carried by said main frame, a shaft journaled on said main frame, a lever secured to said shaft and operatively connected to said fluid motor, a second lever secured to said shaft and connected to said spring, a third lever secured to said shaft, and flexible connections between said third lever and said intermediate and cutter bar frames.

6. A tractor mower comprising a main frame, an intermediate frame universally pivoted to said main frame, a cutter bar frame pivoted to said intermediate frame on an horizontal axis, a fluid motor carried by and having one end secured to said main frame, a balancing spring mounted on and having one end secured to said main frame, a vertical shaft pivoted on said main frame, an arm secured to said shaft, a lever pivoted to said arm and limited in its movement in one direction with respect to said arm and connected to the other end of said fluid motor, a second lever secured to said shaft having an aperture adjacent the free end thereof, a pin carried by said second lever a spring lever pivoted on said shaft and connected to the other end of said spring, said spring lever having an aperture therein adapted to register with the aperture in said second lever for the insertion of said pin, and a third lever secured to said shaft and operatively connected to said intermediate and cutter bar frames.

7. A tractor mower comprising a main frame, an intermediate frame universally pivoted to said main frame, a cutter bar frame pivoted to said intermediate frame on an horizontal axis, a fluid motor carried by and having one end secured to said main frame, a balancing spring mounted on and having one end secured to said main frame, a vertical shaft pivoted on said main frame, an arm secured to said shaft, a lever pivoted to said arm and limited in its movement in one direction with respect to said arm and connected to the other end of said fluid motor, a second lever secured to said shaft having an aperture adjacent the free end thereof, a pin carried by said second lever a spring lever pivoted on said shaft and connected to the other end of said spring, said spring lever having an aperture therein adapted to register with the aperture in said second lever for the insertion of said pin, a third lever secured to said shaft, and flexible means connecting the free end of said third lever to said intermediate and cutter bar frames.

8. A tractor mower comprising a main frame, an intermediate frame pivoted to said main frame, a cutter bar frame pivoted to said intermediate frame and extending laterally therefrom, a fluid motor mounted on said main frame, a balancing spring mounted on said main frame, a vertically disposed shaft journaled on said main frame, a plurality of levers carried by said shaft and operatively connected to said fluid motor and said balancing spring and to said intermediate and cutter bar frames, and means carried by one of said levers for disconnecting the effective balancing tension of said balancing spring from said intermediate and cutter bar frames.

References Cited in the file of this patent

UNITED STATES PATENTS

| | | |
|---|---|---|
| 1,812,689 | Farrar | June 30, 1931 |
| 2,025,970 | Burton | Dec. 31, 1935 |
| 2,172,987 | Mott | Sept. 12, 1939 |
| 2,248,332 | Budelier et al. | July 8, 1941 |
| 2,269,982 | Mott | Jan. 13, 1942 |
| 2,454,697 | Hilblom | Nov. 23, 1948 |
| 2,518,317 | Hilblom | Aug. 8, 1950 |
| 2,524,955 | Borzell et al. | Oct. 10, 1950 |
| 2,533,804 | Hitchcock | Dec. 12, 1950 |
| 2,580,266 | Abgarian | Dec. 25, 1951 |
| 2,582,051 | McCloskey | Jan. 8, 1952 |
| 2,596,641 | Bert et al. | May 13, 1952 |
| 2,616,234 | Love | Nov. 4, 1952 |
| 2,663,133 | Davis | Dec. 22, 1953 |
| 2,663,134 | Bodine | Dec. 22, 1953 |